Oct. 11, 1932.    O. A. WIBERG    1,882,267

LABYRINTH PACKING

Filed April 7, 1930

Inventor
Oscar A. Wiberg
By Henry Orth Jr.
Atty

Patented Oct. 11, 1932

1,882,267

UNITED STATES PATENT OFFICE

OSCAR ANTON WIBERG, OF FINSPONG, SWEDEN

LABYRINTH PACKING

Application filed April 7, 1930, Serial No. 442,302, and in Sweden April 8, 1929.

This invention relates to labyrinth packings of the type which comprises annular disks having sleeve-shaped projections on their sides facing each other, the sleeve-shaped projections of one such disk engaging the spaces between the projections of the adjacent disk or disks. In order to prevent the projections of the disks of such packings from touching each other due to such variations of size as are caused by the varying temperatures to which the projections may be subjected there must be both axial clearance between the disks and radial clearance between the sleeve-shaped projections of the disks. The axial clearance is taken care of by so mounting the disks in the assembling of the packing that the sleeve-shaped projections of any disk will only reach the adjacent disk or disks as a result of the greatest relative axial displacement of the disks possible. The radial clearance, on the contrary, is predetermined once for all in the building of the packing, though it may vary slightly with the temperature or the pressure of the leakage medium. In packings, particularly those of larger dimensions, which are designed for high pressures there is a tendency, however, for the projections to change their diameter outwards or inwards in a greater degree than that corresponding to the variations of the temperature, and, moreover, there is a tendency for the disks to bend. This is due to the fact that, according to the direction of flow of the medium, a higher or lower pressure will appear on the one side or the other of the projections or disks.

The object of the invention is to overcome said difficulty in order thereby to permit the use of a smaller radial clearance with a resulting higher sealing effect of the packing and a reduced tendency of touching.

The invention is characterized, chiefly, by the fact that the sleeve-shaped projections are strengthened at their base portions whereby they are rendered more rigid and less sensible to external powers.

In the accompanying drawing one embodiment of the invention is illustrated.

Figure 1:
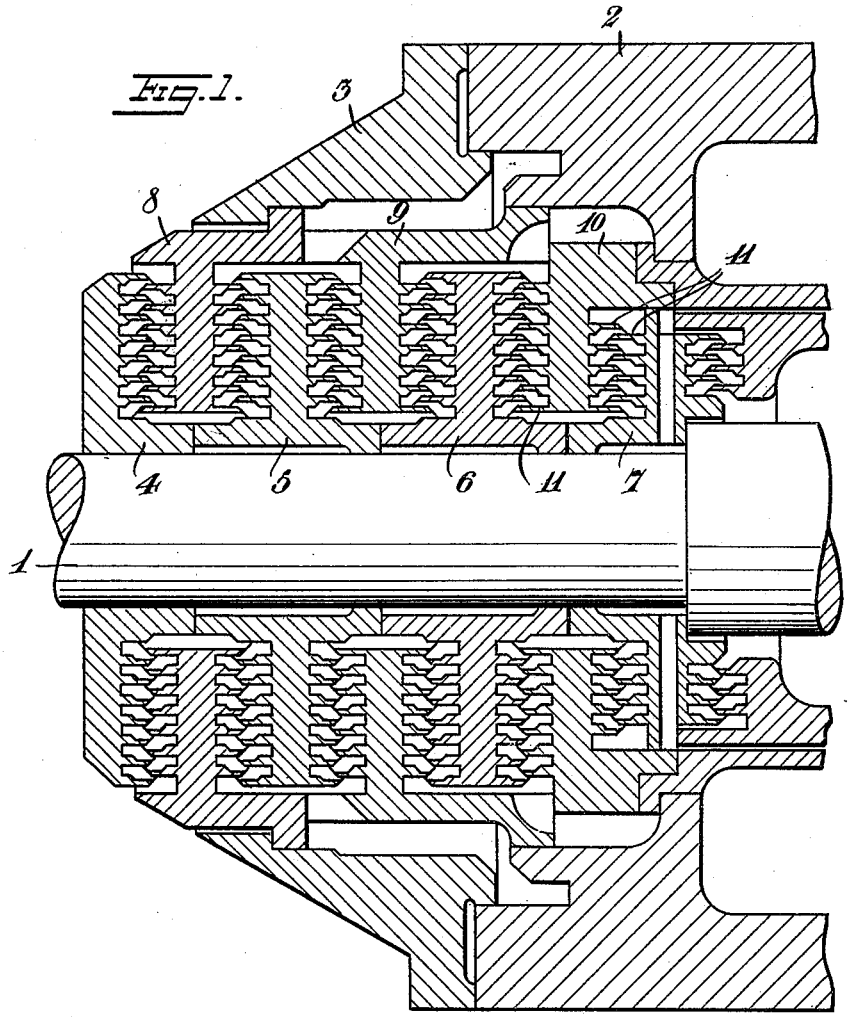
Figure 1 is an axial section of a shaft packing constructed according to the invention.

With reference to Fig. 1, the numeral 1 indicates a shaft and 2 is a wall through which the shaft 1 shall extend tightly. On the one side of the wall 2 (as to the right thereof) atmospheric pressure exists, and on the other side of the wall 2 (as to the left thereof) there exists a higher pressure, as, for instance, a steam pressure. In order to prevent leakage of the high pressure medium between the shaft 1 and the wall 2 a labyrinth packing is inserted in an opening formed in the wall 2 and in a ring 3 bolted to the wall 2.

The labyrinth packing comprises a series of annular disks 4, 5, 6, 7 secured to the shaft 1, the parts of which nearest to the shaft are shaped as distance pieces, and another series of similar disks 8, 9, 10 secured to the ring 3 and the wall 2, respectively, and projecting into the spaces between the disks 4, 5, 6, 7. Formed on the sides of the disks facing each other are axially extending, sleeve-shaped concentric projections 11 which are caused in the assembling of the packing to engage between each other. Said projections may be formed integrally with the respective disks or secured thereto in any appropriate way.

Figures 2, 3:
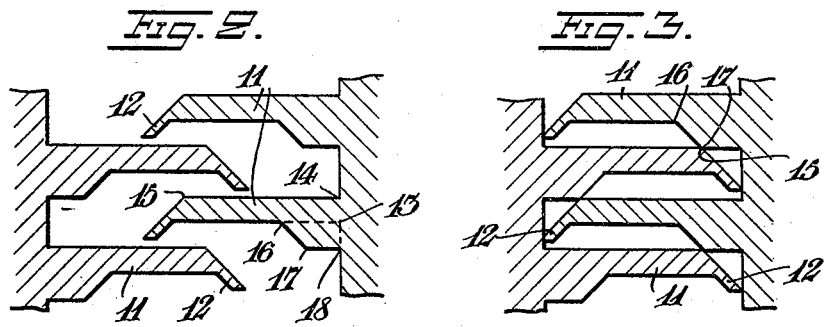
Figs. 2 and 3 are axial sections on an enlarged scale of parts of two packing disks shown in two different positions.

As will more readily appear from Figs. 2 and 3, the projections 11 are cut off conically at their outer edges and formed with inwardly directed, similarly conical flanges 12. In this packing the axial clearance is determined by the axial extent to which the projections 11 of each of two adjacent disks may enter the spaces between the projections of the other disk. Fig. 2 shows a position which presents a great clearance, and Fig. 3 shows the position after maximal displacement of the disks, that is to say, with the projections 11 of each disk in contact with the opposite disk, in which position there is no axial clearance at all. The radial clearance is determined by the distance between the sealing edges 12 and the adjacent inner projection 11.

The projections 11, the hitherto used section of which is represented by the area 13—14—15—16—13 in Fig. 2, are formed according to this invention with a swell at their base, represented by the area 13—16—17—18—13 in Fig. 2, which swell is located on the same side as the respective sealing flange 12, that is on the inner side of the projection. This swell will thus form an annular strengthening rib which adds essentially to the resistance of the projections to external powers.

The dimensions of said strengthening ribs are so chosen that in the position shown in Fig. 3, that is to say, with the sealing flanges 12 of each disk in engagement with the adjacent disk, contact exists between each point 17 of the strengthening rib and the edge 15 of the adjacent projection 11, as shown in Fig. 3. The area 16—17 of the strengthening rib represents a conical surface which in the position shown in Fig. 3 forms an extension of the conical end surface of the adjacent projection 11. This will maintain the radial clearance constant irrespective of the relative axial position of the disks.

It is to be noted that the invention may be applied to all types of labyrinth packings, whether or not they are self-balancing and whether or not the projections are formed integrally with the respective disks.

What I claim is:—

1. A labyrinth packing, comprising annular disks which form axial spaces between themselves and are movable axially toward and from each other, sleeve-shaped projections on said disks extending axially into said spaces so as to overlap alternately from opposite sides, annular ribs at the base portion of the projections on one side thereof, annular sealing flanges at the free ends of the projections so located as to provide sealing constrictions on the same side of the projections as the respective ribs, the radial thickness of the base portion of the projections including said rib being equal to the radial space between adjacent projections of the same disk at the bases of the projections.

2. A labyrinth packing, comprising annular disks which form axial spaces between themselves and are movable axially toward and from each other, sleeve shaped projections on said disks axially extending into said spaces so as to overlap alternately from opposite sides, annular ribs at the base portion of the projections on the inner circumferential surface thereof, and sealing flanges at the free ends of the projections so located as to provide sealing constrictions on the inner side of the projections, the radial thickness of the base portion of the projections including said rib being equal to the radial space between adjacent projections of the same disk at the bases of the projections.

3. A labyrinth packing, comprising annular disks which form axial spaces between themselves and are movable toward and from each other axially, sleeve-shaped concentric projections axially extending into said spaces alternately from the respective disks so as to overlap alternately from opposite sides, said sleeve-shaped projections having straight cylindrical outer surfaces and having their ends cut off along conical surfaces, the apices of which are directed away from the respective disks, inwardly directed similarly conical sealing flanges at said ends of the projections, annular strengthening ribs on the inner side of the projections at the base thereof, said strengthening ribs being bounded in axial direction by conical surface which in that relative position of the disks in which the axial distance therebetween is shortest are each located on the same conical surface as the conical end surface of the adjacent inner projection.

4. A labyrinth packing, comprising annular disks which form axial spaces between themselves and are movable toward and from each other axially, sleeve-shaped concentric projections axially extending into said spaces alternately from the respective disks so as to overlap alternately from opposite sides, said sleeve-shaped projections having straight cylindrical outer surfaces and having their ends cut off along conical surfaces the apices of which are directed away from the respective disks, inwardly directed similarly conical sealing flanges at the ends of the projections, annular strengthening ribs on the inner side of the projections at the base thereof, said strengthening ribs being bounded in axial direction by conical surfaces which in that relative position of the disks in which the axial distance therebetween is shortest are each located on the same conical surface as the conical end surface of the adjacent inner projection, the radial thickness of the base portion of the projections being substantially equal to the radial space between adjacent projections of the same disk at the bases of the projections so that in the said relative position the cut off end of each projection will cooperate at its outer edge with the rib of the adjacent outer projection and at its inner edge with the respective side surface of the opposite disk to form throttling places at these two edges.

In testimony whereof, I have signed my name.

OSCAR ANTON WIBERG.